United States Patent
Ruiterkamp

(10) Patent No.: US 10,577,097 B2
(45) Date of Patent: Mar. 3, 2020

(54) GLIDER FOR AIRBORNE WIND ENERGY PRODUCTIONS

(71) Applicant: AMPYX Power B.V., The Hague (NL)

(72) Inventor: Richard Ruiterkamp, The Hague (NL)

(73) Assignee: AMPYX Power B.V., The Hague (NL)

(*) Notice: Subject to any disclaimer, the term of this patent is extended or adjusted under 35 U.S.C. 154(b) by 0 days.

(21) Appl. No.: 14/625,652

(22) Filed: Feb. 19, 2015

(65) Prior Publication Data
US 2015/0266574 A1 Sep. 24, 2015

Related U.S. Application Data

(63) Continuation of application No. PCT/EP2013/002446, filed on Aug. 14, 2013.

(30) Foreign Application Priority Data

Aug. 23, 2012 (EP) .................................... 12181506

(51) Int. Cl.
*B64C 31/06* (2006.01)
*F03D 5/00* (2006.01)

(52) U.S. Cl.
CPC .............. *B64C 31/06* (2013.01); *F03D 5/00* (2013.01); *F05B 2240/921* (2013.01); *Y02E 10/70* (2013.01); *Y02E 10/723* (2013.01)

(58) Field of Classification Search
CPC ............ B64C 31/06; F03D 5/00; Y02E 10/70
See application file for complete search history.

(56) References Cited

U.S. PATENT DOCUMENTS

| 3,987,987 A | 10/1976 | Payne et al. |
| 4,251,040 A * | 2/1981 | Loyd .................... B64C 39/022 |
| | | 244/154 |
| 8,082,115 B2 * | 12/2011 | Bechhoefer ............. F03D 7/047 |
| | | 290/44 |

(Continued)

FOREIGN PATENT DOCUMENTS

| FR | 1050562 A | 1/1954 |
| WO | 2010/148373 A1 | 12/2010 |

OTHER PUBLICATIONS

International Search Report dated Sep. 20, 2013 in corresponding International Application No. PCT/EP2013/002446, filed Aug. 23, 2012.

*Primary Examiner* — Viet P Nguyen
(74) *Attorney, Agent, or Firm* — Rankin, Hill & Clark LLP

(57) ABSTRACT

A glider, a system and methods for electric power production from wind are disclosed. The glider includes an airfoil, onboard steering means for pitching, rolling and yawing the glider when airborne, sensor means that provide a first signal related to an absolute position of the glider, a second signal related to an air speed of the glider and a third signal related to an acceleration of the glider, a control device connected to the steering means for controlling autonomous flight of the glider based on the signals provided by the sensor means, and a connection means for a tether connecting the glider to a ground-based electrical machine constructed for converting a lift force generated upon exposure of the airfoil to wind and transferred to the ground via the tether into electric power. The system includes the glider, the ground-based electrical machine and tether.

17 Claims, 2 Drawing Sheets

(56) References Cited

U.S. PATENT DOCUMENTS

| | | | |
|---|---|---|---|
| 8,552,349 B1* | 10/2013 | Alexander | F42B 10/26 102/200 |
| 2002/0040948 A1 | 4/2002 | Ragner | |
| 2008/0265097 A1* | 10/2008 | Stecko | B64D 39/00 244/135 A |
| 2009/0212574 A1* | 8/2009 | Wrage | B63H 9/0685 290/54 |
| 2009/0230236 A1* | 9/2009 | Tillotson | B64B 1/06 244/30 |
| 2010/0026007 A1 | 2/2010 | Bevirt | |
| 2010/0032948 A1* | 2/2010 | Bevirt | F03D 1/00 290/44 |
| 2011/0121570 A1* | 5/2011 | Bevirt | F03D 5/06 290/44 |
| 2011/0186687 A1* | 8/2011 | Elder | B64C 31/06 244/155 A |
| 2011/0266809 A1* | 11/2011 | Calverley | F03D 5/00 290/55 |
| 2012/0104763 A1* | 5/2012 | Lind | B64C 31/06 290/55 |
| 2012/0292911 A1* | 11/2012 | Bolin | F03B 17/061 290/54 |
| 2014/0361122 A1* | 12/2014 | Ruiterkamp | F03D 5/00 244/154 |
| 2015/0041598 A1* | 2/2015 | Nugent | H02J 17/00 244/53 R |

\* cited by examiner

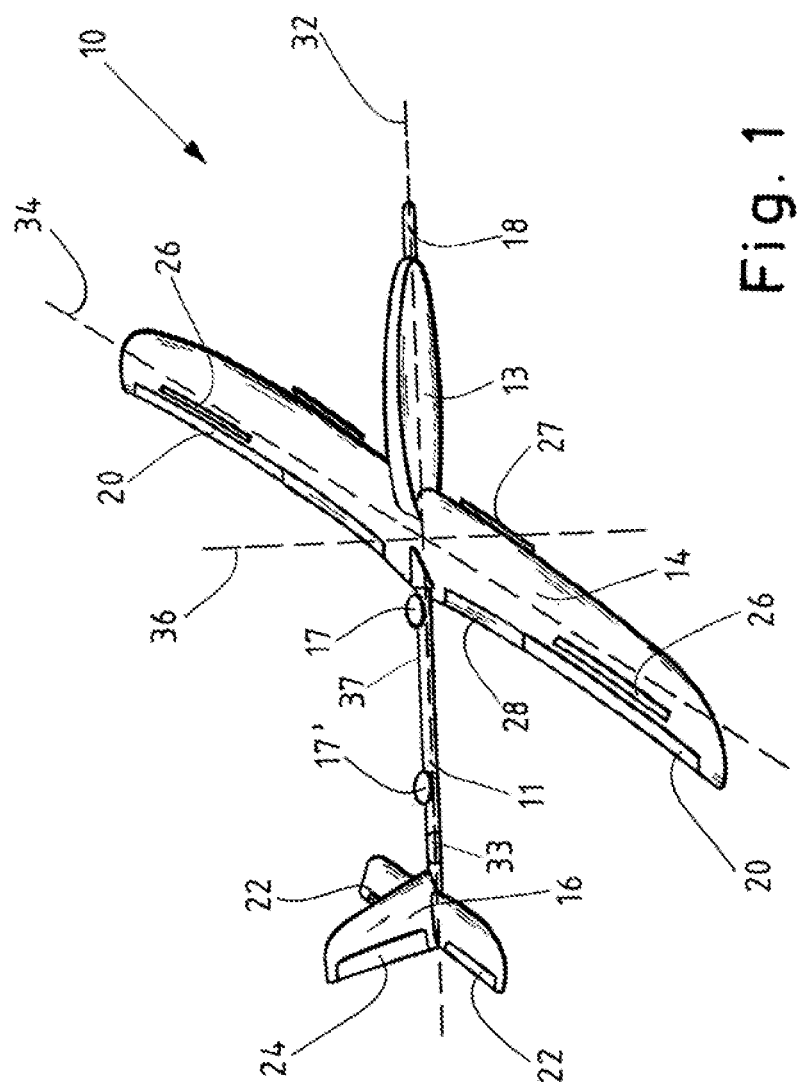

GLIDER FOR AIRBORNE WIND ENERGY PRODUCTIONS

CROSS-REFERENCE TO RELATED APPLICATIONS

This application is a continuation of International Application No. PCT/EP2013/002446, filed Aug. 14, 2013, and claims priority to EP 12181506.2, filed Aug. 23, 2012.

BACKGROUND OF INVENTION

Field of Invention

The invention relates to a glider for electric power production from wind. The invention further relates to a system for electric power production from wind.

Brief Description of Related Art

The production of electric power from wind is generally accomplished by airfoils or structures with an aerodynamic profile, which produce lift forces upon exposure to wind. Thereby, energy is extracted from the wind, which can be converted into electricity, for example by exploring said lift forces to drive an electrical generator. Well known wind turbines for instance comprise a rotor with aerodynamically profiled rotor blades, wherein the lift forces of the rotor blades cause the rotor to turn. The rotor is mounted to an electrical generator, which is for example located on top of a tower, for production of electricity.

In order to explore wind energy resources at altitudes above a few hundred meters over ground, where the average wind is stronger and steadier due to less disturbing interaction with the earth's surface, it has been proposed to use airborne airfoils. These concepts are often referred to as airborne wind energy or airborne wind energy production.

One of the challenges of airborne wind energy production is the transferal of energy extracted from the wind at high altitudes to the ground. Two general approaches are proposed, the first providing for an airborne generator and subsequently a relatively heavy flight object, and the other providing for a ground based generator, wherein the energy extracted from the wind has to be mechanically transferred to the ground.

An example of the latter approach is the so-called pumping kite concept. A kite flies downwind of a ground-based generator connected to its steering lines, thereby pulling the lines and driving the generator as the kite departs from the generator. In order to recover the lines, the generator is driven as a motor to pull back the kite. During this phase, the kite is steered to exert less pull on the lines, so that power consumption for pulling back the kite is less than the power produced by the kite pulling the lines before.

The underlying problem of the invention is to provide for electric power production from wind using an airborne airfoil, wherein in particular the integrated energy yield is to be improved with respect to the prior art described above.

BRIEF SUMMARY OF THE INVENTION

According to the invention, this problem is solved by a glider for electric power production from wind, said glider comprising an airfoil, onboard steering means for pitching, rolling and yawing the glider when airborne, sensor means providing a first signal related to an absolute position of the glider, a second signal related to an air speed of the glider and a third signal related to an acceleration of the glider, a control device connected to the steering means for controlling autonomous flight of the glider based on the signals provided by the sensor means, and a connection means for a tether connecting the glider to a ground-based electrical machine constructed for converting a lift force generated upon exposure of the airfoil to wind and transferred to the ground via the tether into electric power.

A glider or sailplane in terms of the invention in particular is a fixed wing aircraft, especially without propulsion means such as propellers or jet engines, wherein on-board steering means allow for full flight maneuverability of the glider around its longitudinal axis, its lateral axis and its vertical axis. In terms of the invention, these three principle axes form a Cartesian coordinate system, wherein the origin of said coordinate system is defined to be at the center of gravity of the glider.

In general terms, with reference to straight and level flight, the longitudinal axis relates to the direction of motion, the vertical axis relates to the direction of lift and the lateral axis is essential horizontal to complete a Cartesian coordinate system.

The glider for instance comprises a fuselage and a main wing, wherein the main wing constitutes or comprises an airfoil. In this configuration, the longitudinal axis is essential parallel to the fuselage, the lateral axis is essential parallel to the main wing and the vertical axis is perpendicular to both the longitudinal and the lateral axis. Those skilled in the art will appreciate that the glider can have another airplane configuration, for instance an all-wing aircraft, with appropriate definitions of the principle axes.

In terms of the invention, rolling refers to a rotation of the glider around its longitudinal axis, pitching refers to a rotation of the glider around its lateral axis and yawing refers to a rotation of the glider around its vertical axis.

A glider provides the advantage of low aerodynamic resistance or drag and a high aerodynamic lift due to the fixed wing with rigid aerodynamic profile or airfoil, respectively. This is in particular beneficial, because the energy effectively extracted from the wind strongly depends on lift and drag, in particular on the so-called lift-over-drag-ratio.

The sensor means and control device of the glider according to the invention allow for unmanned flight, which reduces the total weight of the glider. Therefore, a larger amount of the total lift force generated by the airfoil is available for electric power production and thus increases the integrated energy yield.

For enhanced safety of the glider, the connection means in particular are arranged for releasable connection of a tether to the glider, wherein the tether is connecting or arranged for connecting the glider to a ground-based electrical machine.

The sensor means and control device also allow for automated optimization of the flight, in particular in order to maximize the lift force during the energy production phase and in order to minimize the pull on the tether during the recovery phase. Also, the flight during the recovery phase can be optimized for minimum duration.

In terms of the invention, a signal related to a specific parameter in particular is a measurement value or a set of measurement values, which is continuously or repeatedly taken during the flight and allows determination of the specific parameter.

The position of the glider in particular is the absolute position relative to the ground, which for instance is given in world coordinates, i.e. by longitude, latitude and height above sea level.

A signal related to the position for instance is the ground speed of the glider, which allows the iterative determination of the position of the glider starting from a known initial position. The ground speed in particular is the movement or velocity, respectively, of the glider relative to the ground.

In a preferred embodiment of the invention, the sensor means comprise a first position sensor, in particular a GPS sensor, i.e. a sensor according to the standard of the well known Global Positioning System. A position sensor in particular provides a direct measurement signal of the absolute position, which often is more precise than the iterative position determination. Those skilled in the art will appreciate that a position sensor can be a sensor according to the standards of any satellite based positioning systems, for instance the Galileo project, or can be based on other navigation technologies, such as RADAR.

Preferably, the sensor means comprise a second position sensor, in particular a GPS sensor, wherein the second position sensor is located at a given distance to the first position sensor. This allows determining the orientation of the virtual line between the first position sensor and the second position sensor and thus gives the orientation of the glider relative to the world coordinate system.

In contrast to the ground speed, the air speed is the movement or velocity, respectively, of the glider with respect to the surrounding air. In particular due to the presence of wind, the air speed in general differs from the ground speed. However, the air speed can be derived from the ground speed and the wind speed, i.e. the velocity of the air relative to the ground, wherein the ground speed for instance can be determined from the change in position of the glider with time.

It is preferred that the sensor means comprise an air speed sensor, in particular a pitot tube. Here, the signal related to the air speed is a direct measurement signal and generally more precise than the indirect determination of the air speed from the ground speed and the wind speed.

A pitot tube is a well-known instrument for determining the speed of an aircraft based on a measurement of a pressure difference, for instance the difference of an air pressure in a direction of flight (dynamic pressure) and an ambient air pressure in a direction perpendicular to the direction of flight (static pressure).

For instance, a pitot tube comprises a cylindrical tube oriented along the longitudinal axis of an airplane with a hole at the tip and a hole at the side, wherein the two holes are connected via internal passageways with a differential pressure sensor.

Preferably, the air speed sensor is a directional air speed sensor, in particular a multichannel pitot tube. For instance, a left-right pressure difference and a bottom-top pressure difference are measured in addition to the dynamic-static pressure difference described above.

For instance, a multichannel pitot tube comprises a cylindrical tube with a dome-shaped tip oriented with the longitudinal axis of an airplane, said tube comprising five holes at the tip for determining the dynamic pressure and at least one hole at the side of the tube for determining the static pressure. It can be provided for more than one hole for determining the static pressure, for instance four or even twelve holes evenly distributed along a circle around the side of the tube. The five holes at the tip are arranged with one hole at the center of the dome-shaped tip and the other four holes arranged at equal distance to the center hole, wherein these four holes are pair-wise oriented with the lateral axis and vertical axis of the air-plane, respectively. In this configuration, the left-right pressure difference is the pressure difference from the two holes oriented with the lateral axis, the bottom-top pressure difference is the pressure difference from the two holes oriented along the vertical axis, and the dynamic-static pressure difference is the pressure difference from the center hole at the tip and the average pressure from the holes at the side of the tube. Alternatively, the absolute pressure at each of the nine holes can for instance be measured independently, wherein the left-right pressure difference, the bottom-top pressure difference and the dynamic-static pressure difference are calculated from these measurements, respectively.

An acceleration of the glider can be a translational acceleration or, for a rotational movement is an accelerated movement, a rotational velocity and is induced by forces acting on the glider as a whole. A signal related to acceleration for instance is the second derivative with time of the position in case of a translational acceleration and the first derivative with time of the orientation in case of a rotational velocity.

In a preferred embodiment of the invention, the sensor means comprise an inertia sensor, which in particular provides for a direct measurement of a translational acceleration and/or rotational velocity. For instance, the inertia sensor measures the translational acceleration in three different directions and the rotational velocity around three different axes.

An appropriate inertia sensor includes in particular an accelerometer for measurement of a translational acceleration and/or a gyroscope for measurement of a rotational velocity.

The steering means preferably comprise at least one aerodynamically active control surface.

Aerodynamically active control surfaces are used to exert torque on the glider around one or more of the glider's principle axes. These control surfaces for instance comprise at least one aileron to mainly induce rolling and/or at least one elevator to mainly induce pitching and/or at least one rudder to mainly induce yawing. However, those skilled in the art will appreciate that other control surfaces known in aviation technology are also appropriate steering means in terms of the invention. In particular, a particular control surface can induce a rotation around an arbitrary axis, which does not correspond to one of the principle axes of the glider.

Besides control surfaces, the steering means of the glider for instance further comprise actuators, such as electric motors or hydraulic systems with pumps and cylinders, for moving the control surfaces. These actuators are for instance powered by an on-board power source, such as a battery. Alternatively, the connection means can include a power plug for connecting the glider to a ground-based power source via the tether, which significantly reduces the weight of the glider. In this configuration, the glider may still comprise a small emergency battery for continued safe flight in case of loss of connection to the ground.

A further embodiment of the invention is characterized in that the control device comprises a data storage unit for storing data related to flight characteristics of the glider and a data processor unit for deriving control signals for the steering means based on the stored data and on the signals provided by the sensor means.

Here, data related to flight characteristics for instance is a plane model, which in particular comprises a set of measured or simulated response curves for the correlation between the operation or change in operation of the steering means and the resulting state or change in state of the glider.

Preferably, the control device implements a Kalman filter. By this, the effect of measurement uncertainties on the control of the steering means and consequently on the flight of the glider is reduced.

It is further preferred that the control device implements an un-scented Kalman filter, for an unscented Kalman filter in particular allows for non-linear dependencies and correlations.

For optimized electric power yield, the control device preferably provides for a first operation mode for pulling on a tether connecting the glider with a ground-based electrical machine and wherein the control device provides for a second operation mode for approaching the electrical machine.

The two operation modes in particular differ by the intended flight path or flight pattern, respectively. For instance, the flight pattern of the first operation mode is a high lift flight pattern with mainly crosswind flight of the glider, while the flight pattern of the second operation mode comprises a mainly straight flight path of the glider against the wind.

In a further preferred embodiment of the invention, the glider comprises at least one aerodynamic control surface for varying a lift coefficient of the airfoil and/or for varying a drag coefficient of the airfoil and/or for varying a drag coefficient of the glider. This can for instance optimize lift and/or drag of the glider optimized with respect to the current operation mode. In particular, high lift and low drag, as is beneficial for the first operation mode, could delay descent of the glider and thus result in a slower return during the second operation mode. It is therefore of advantage, if the lift could be reduced and/or the drag could be increased during the second operation mode.

Suitable control surfaces are so-called spoilers located on top of the airfoil, so-called slats located at the leading edge of the airfoil, so-called flaps located at the trailing edge of the airfoil and so-called air brakes, which affect only the drag coefficient of the whole glider.

Additionally or alternatively, the airfoil may comprise a variable aerodynamic profile, which is another way for varying the lift coefficient and/or the drag coefficient. An airfoil with variable aerodynamic profile for instance is semi-rigid and can be modified in its curvature.

The underlying problem of the invention is also solved by a system for electric power production from wind comprising a glider according to the invention, a ground-based electrical machine and a tether connecting the glider with the electrical machine, wherein the electrical machine is constructed for converting a lift force generated upon exposure of the airfoil to wind and transferred to the ground via the tether into electrical power.

The problem is further solved by the use of a glider according to the invention for production of electric power from wind.

Further characteristics of the invention will become apparent from the description of the embodiments according to the invention together with the claims and the included drawings. Embodiments according to the invention can fulfill individual characteristics or a combination of several characteristics.

BRIEF DESCRIPTION OF THE DRAWINGS

The invention is described below, without restricting the general intent of the invention, based on exemplary embodiments, wherein reference is made expressly to the drawings with regard to the disclosure of all details according to the invention that are not explained in greater detail in the text. The drawings show in:

FIG. 1 schematically a glider according to the invention;

In the drawings, the same or similar types of elements or respectively corresponding parts are provided with the same reference numbers in order to prevent the item from needing to be reintroduced.

DETAILED DESCRIPTION OF THE INVENTION

Figure 2A:
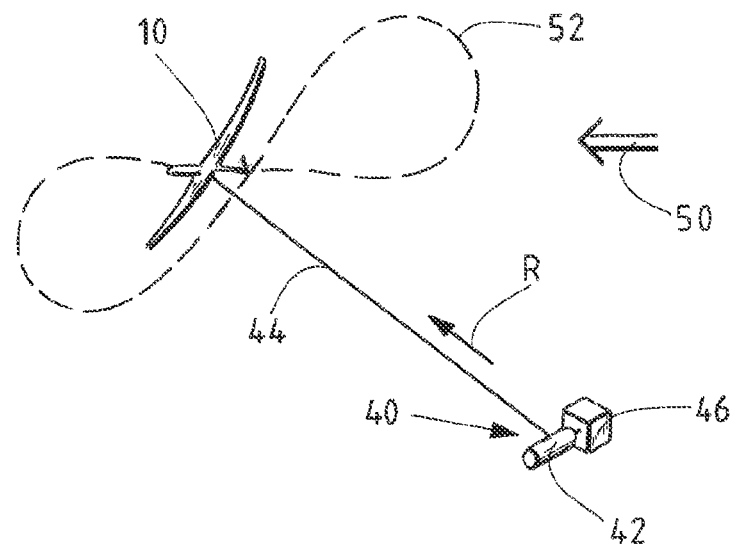
FIG. 2a schematically the operation of a system according to the invention in a first operation mode.

FIG. 1 shows an exemplary embodiment of a glider 10 for electric power production from wind 50 according to the invention.

The glider 10 is designed as a fixed wing aircraft comprising a fuselage, a main wing 14, a tailplane 16 and control surfaces 20, 22, 24. Also depicted in FIG. 1 are the longitudinal axis 32, the lateral axis 34 and the vertical axis 36, which meet at the center of gravity of the glider 10 and which constitute the intrinsic coordinate system of the glider 10.

In the example shown, the fuselage comprises a tube constructed from fiber reinforced composite material as mechanical backbone 11 between the main wing 14 and the tailplane 16 and a nacelle 13, which is mounted in front of the main wing 14.

The main wing 14 can for instance be constructed from a single wing, as in the embodiment depicted in FIG. 1. However, alternative designs, for instance with a separate main wing 14 on either side of the fuselage are within the scope of the invention.

In flight, the glider 10 is maneuvered by control surfaces, which in the exemplary embodiment comprise ailerons 20 at either side of the main wing 14, as well as elevators 22 and a rudder 24 at the tailplane 16. The control surfaces 20, 22, 24 for instance are hinged surfaces used to induce torque around the principle axes 32, 34, 36 of the glider 10 by aerodynamic means.

Torque around the longitudinal axis 32 is induced by means of the ailerons 20, which can be or are operated simultaneously and in opposite directions. Here, opposite directions means that when the left aileron is moved upwards with respect to the main wing 14, the right aileron is moved downwards. By this, lift is enhanced on the right side of the main wing 14 and reduced on the left side of the main wing 14, causing a torque around the longitudinal axis 32. The resulting movement of the glider 10, a rotation around its longitudinal axis 32, is referred to as rolling.

A rotation of the glider 10 around its lateral axis 34, which is referred to as pitching, is achieved by the elevators 22, which are used to increase or decrease the lift at the tailplane, thereby inducing a torque around the lateral axis 34.

The rudder 24 induces rotation of the glider 10 around its vertical axis 36, which is referred to as yawing.

In addition to the control surfaces 20, 22, 24, the glider 10 comprises spoilers 26 on either side of the main wing 14, which can be raised to decrease the lift coefficient and at the same time increase the drag coefficient of the main wing 14. Further control surfaces at the main wing 14 could be foreseen for affecting the lift coefficient and/or drag coefficient of the main wing 14. In particular, these could be control surfaces at the leading edge of the main wing 14, so called slats 27, and/or at the trailing edge of the main wing 14, so-called flaps 28. Similar effects can be achieved with a wing with variable aerodynamic profile, for instance a semi-rigid wing where the curvature of the aerodynamic profile can be varied.

Additionally or alternatively, air brakes 33 at the fuselage 37 could be foreseen, which increase the drag coefficient of the whole glider 10 without changing the lift coefficient of the main wing 14.

The operation of the control surfaces 20, 22, 24 is controlled by a control device located in the nacelle 13, which for instance generates steering signals for moving the control surfaces 20, 22, 24 according to an intended flight path or flight pattern 52, 54, respectively.

The intended flight path, to which the flight of the glider 10 is controlled, can be externally set or derived by the control device according to an operation mode of the control device. In particular, the flight path may be controlled and adopted continuously, for instance to account for unsteady conditions of the wind 50.

For instance, the control device determines an estimate of the current state of the glider 10 and compares this with a desired state defined by the intended flight path 52, 54. In case the estimated state and the desired state differ, the control device determines steering signals for the control surfaces 20, 22, 24 taking into account the known flight characteristics of the glider 10.

The state or state vector of the glider 10 is a set of parameters containing enough information to describe the momentary flight of the glider 10 and the differential evolution thereof. The state vector of the glider 10 for instance comprises the position of the glider 10 in world coordinates, the velocity vector of the glider 10 relative to the surrounding air and the translational acceleration and rotational velocity in three dimensions each of the glider 10.

The state vector is continuously determined from measurement signals of two position sensors 17, 17' mounted on the mechanical backbone 11, an air speed sensor 18 mounted at the tip of the nacelle 13 and an inertia sensor with a three-direction accelerometer and a three-axis gyroscope housed inside the nacelle.

To limit the influence of measurement uncertainties on the flight of the glider 10, the control device implements a Kalman filter, more specifically an unscented Kalman filter. In particular, the control device comprises a data storage unit, a data processor unit and appropriate algorithms implemented in hardware or software.

For production of electric power, the glider 10 is connected to a ground station 40 via a tether 44, which is attached to or connected with the glider 10 at a connection means, which is preferably arranged close to the centre of gravity of the glider 10. This way, varying loads on the tether 44 do not significantly impair the balance of the glider 10 in flight.

At the ground station 40, excess length of the tether 44 is stored on a reel 42, which is connected to an electrical machine 46. The electrical machine 46 is connected to an electricity storage and/or distribution system (not shown) such as a power grid, a transformer station or a large-scale energy reservoir. Those skilled in the art will appreciate that the power storage and/or distribution system can be any device or system capable of receiving electricity from and delivering electricity to the rotating electrical machine.

Figure 2B:
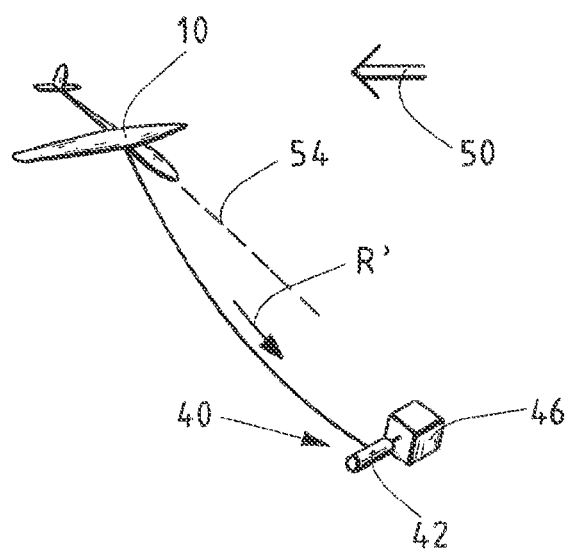
FIG. 2b schematically the operation of a system according to the invention in a second operation mode.

The system comprising the glider 10, the tether 44 and the ground station 40 is alternately operated in a first operation mode for production of electric power, illustrated in FIG. 2a, and a second operation mode for system recovery, illustrated in FIG. 2b.

In the first operation mode, which in particular is an energy production operation mode, the glider 10 is, by means of the control device, controlled to follow a high lift flight pattern indicated by line 52 downwind of the ground station 40. In the figures, the direction of the wind is indicated by arrow 50. During crosswind flight, in particular fast crosswind flight, the airfoil or the main wing 14, respectively, of the glider 10 generates a lift force much larger than required to keep the glider 10 at a given altitude. As a consequence, the glider exerts a pull on the tether 44, which is correlated to the excess lift force.

The pull on the tether 44 is used for reeling out the tether 44 from the reel 42 in direction of arrow R, thereby inducing a rotation of the reel 42. The resulting torque, which in particular depends on the diameter of the reel 42 and the force with which the tether 44 is pulled, is transmitted to the electrical machine 46, where the mechanical energy is transformed to electric power. Optionally, a gearbox is arranged between the reel 42 and the electrical machine 46, which is not shown in the figures for reasons of simplicity.

As long as the tether 44 is reeled out, the glider 10 flies away from the ground station 40. Thus, the overall length of the tether 44 limits maintaining the first operation mode.

For recovery of the tether 44, the glider 10 is, again by means of the control device, controlled to fly towards the ground station 40. As the glider 10 approaches the ground station 40, the free length of the tether 44 is shortened and the tether 44 is reeled in onto the reel 42 as indicated by arrow R' by operating the electrical machine 46 as a motor rather than as a generator. The necessary power for instance is provided or delivered by the electricity storage and/or distribution system.

In the second operation mode, it is preferred that the pull on the tether 44 is as low as possible in order to minimize power consumption for reeling in the tether 44 and as fast as possible in order to minimize the dead time, i.e. the period of time where no electric power is produced. The glider 10 therefore is controlled to follow a low lift flight pattern 54, which for instance is a descent or a fast dive of the glider 10 against the wind 50 towards the ground station 40. However, the low lift flight pattern 54 can also be an approach of the glider 10 towards the ground station 40 without loss in altitude, including a slight gain in altitude.

If the approach runs slow, for instance because a high lift coefficient of the main wing 14 delays a descent of the glider 10, the lift could be decreased and/or the drag could be increased by means of the spoilers 26 or the equivalent measures discussed above. This way, the return of the glider 10 towards the ground station 40 can be sped up and the time where the system does not produce electric power is reduced.

An optimization of the lift and/or drag can also be achieved by modified operation of the ailerons 20. Instead of anti-parallel operation for rolling the glider 10, both ailerons 20 in parallel can be moved upwards for decreased lift or downwards for increased lift.

If the glider has two control surfaces on either side of the main wing 14, for instance an aileron 20 and an additional flap, drag can be increased without or with almost no change in the lift by moving the ailerons 20 up and the flaps down or vice versa. Here, flap in particular refers to a hinged control surface at the trailing edge of the main wing 14, i.e. a control surface which is structurally similar to an aileron 20.

All named characteristics, including those taken from the drawings alone, and individual characteristics, which are disclosed in combination with other characteristics, are considered alone and in combination as important to the invention. Embodiments according to the invention can be fulfilled through individual characteristics or a combination of several characteristics.

LIST OF REFERENCES NUMBERS APPEARING IN THE ACCOMPANYING DRAWING FIGURES 10 glider
11 mechanical backbone
13 nacelle
14 main wing
16 tailplane
17, 17' position sensor
18 air speed sensor
20 aileron
22 elevator
24 rudder
26 spoiler
32 longitudinal axis
34 lateral axis
36 vertical axis
40 ground station
42 reel
44 tether
46 electrical machine
50 wind
52 high lift flight pattern
54 low lift flight pattern

What is claimed is:

1. A glider for electric power production from wind, said glider comprising:
an aircraft having a fuselage, a fixed wing and a tailplane, said fixed wing comprising an airfoil and at least one aileron, and said tailplane comprising at least one elevator and a rudder,
sensors that provide a signal for determining an absolute position of the glider relative to ground, that provide a signal for determining an air speed of the glider and that provide a signal for determining an acceleration of the glider,
a control device connected to the at least one aileron, the at least one elevator and the rudder, said control device being configured to control autonomous flight of the glider based, at least in part, on the signals provided by the sensors, and
a connector configured to releasably connect the glider to a tether extending from a ground-based electrical machine that converts a pulling force generated by the glider upon exposure of the airfoil to wind into electric power,
wherein the glider has at least one aerodynamic control surface for varying one or more of a lift coefficient of the airfoil, a drag coefficient of the airfoil and a drag coefficient of the glider,
wherein the at least one aerodynamic control surface is selected from the group consisting of spoilers located on top of the airfoil, slats located at a leading edge of the airfoil, flaps located at a trailing edge of the airfoil and air brakes at the fuselage,
wherein the control device is configured to control autonomous flight of the glider in alternating cycles of
a first operation mode wherein the glider pulls on and reels out the tether connecting the glider to the ground-based electrical machine and thereby produces electric power, and
a second operation mode wherein the glider approaches the ground-based electrical machine as the ground-based electrical machine reels in the tether in preparation of another cycle of the first operation mode, and
wherein the control device is configured to control said at least one aerodynamic control surface to vary one or more of the lift coefficient of the airfoil, the drag coefficient of the airfoil and the drag coefficient of the glider such that the glider operates with reduced lift and/or increased drag in the second operation mode as compared to the first operation mode.

2. The glider according to claim 1, wherein one of the sensors is a first GPS sensor.

3. The glider according to claim 2, wherein another of the sensors is a second GPS sensor, and wherein the second GPS sensor is located on the glider at a given distance relative to the first GPS sensor.

4. The glider according to claim 1, wherein one of the sensors is a pitot tube.

5. The glider according to claim 1, wherein one of the sensors is a directional air speed sensor.

6. The glider according to claim 5, wherein the directional air speed sensor is a multichannel pitot tube.

7. The glider according to claim 1, wherein the glider further comprises an inertia sensor.

8. The glider according to claim 7, wherein the inertia sensor includes a gyroscope and/or an accelerometer.

9. The glider according to claim 1, wherein the control device comprises a data storage unit for storing data related to flight characteristics of the glider and a data processor unit for deriving control signals for the at least one aileron, the at least one elevator and the rudder based on the stored data and on the signals provided by the sensors.

10. The glider according to claim 1, wherein the control device implements a Kalman filter.

11. The glider according to claim 10, wherein the Kalman filter is an unscented Kalman filter.

12. A system for electric power production from wind comprising a glider according to claim 1, a ground-based electrical machine and a tether for connecting the glider with the electrical machine, wherein the electrical machine is configured to convert a lift force generated upon exposure of the airfoil of the glider to wind and transferred to the ground via the tether into electrical power.

13. A method for the production of electric power from wind comprising:
providing a glider according to claim 1;
exposing the airfoil of the glider to wind to generate a lift force during an autonomously controlled flight of the glider;
transferring the lift force from the glider to a ground-based electrical machine via a tether; and
converting the lift force transferred to the ground-based electrical machine into electrical power.

14. A glider for electric power production from wind, said glider comprising:
an aircraft having a fuselage, a fixed wing and a tailplane, said fixed wing comprising an airfoil and at least one aileron, and said tailplane comprising at least one elevator and a rudder,
sensors that provide a signal for determining an absolute position of the glider relative to ground, that provide a signal for determining an air speed of the glider and that provide a signal for determining an acceleration of the glider,
a control device connected to the at least one aileron, the at least one elevator and the rudder, said control device being configured to control autonomous flight of the glider based, at least in part, on the signals provided by the sensors, and a connector configured to releasably connect the glider to a tether extending from a ground-based electrical machine that converts a pulling force generated by the glider upon exposure of the airfoil to wind into electric power, wherein the airfoil has an aerodynamic profile that is variable by changing curvature of the fixed wing, which is semi-rigid, wherein the control device is configured to control autonomous flight of the glider in alternating cycles of a first operation mode wherein the glider pulls on and reels out the tether connecting the glider to the ground-based electrical machine and thereby produces electric power, and a second operation mode wherein the glider approaches the ground-based electrical machine as the ground-based electrical machine reels in the tether in preparation of another cycle of the first operation mode, and wherein the control device is configured to control said variable aerodynamic profile to vary one or more of the lift coefficient of the airfoil, the drag coefficient of the airfoil and the drag coefficient of the glider such that the glider operates with reduced lift and/or increased drag in the second operation mode as compared to the first operation mode.

15. A glider for electric power production from wind, said glider comprising:

an aircraft having a fixed wing comprising an airfoil and onboard steering elements for pitching, rolling and yawing the glider when airborne, sensors that provide a signal for determining an absolute position of the glider relative to ground, that provide a signal for determining an air speed of the glider and that provide a signal for determining an acceleration of the glider, a control device connected to the onboard steering elements, said control device being configured to control autonomous flight of the glider based, at least in part, on the signals provided by the sensors, and a connector configured to releasably connect the glider to a tether extending from a ground-based electrical machine that converts a pulling force generated by the glider upon exposure of the airfoil to wind into electric power, wherein the glider has at least one aerodynamic control surface for varying one or more of a lift coefficient of the airfoil, a drag coefficient of the airfoil and a drag coefficient of the glider selected from the group consisting of spoilers located on top of the airfoil, slats located at a leading edge of the airfoil, flaps located at a trailing edge of the airfoil and air brakes at the fuselage and/or the airfoil has an aerodynamic profile that is variable by changing curvature of the fixed wing, which is semi-rigid, wherein the control device is configured to control autonomous flight of the glider in alternating cycles of a first operation mode wherein the glider pulls on and reels out the tether connecting the glider to the ground-based electrical machine and thereby produces electric power, and a second operation mode wherein the glider approaches the ground-based electrical machine as the ground-based electrical machine reels in the tether in preparation of another cycle of the first operation mode, and wherein the control device is configured to control said at least one aerodynamic control surface and/or said variable aerodynamic profile of the airfoil such that the glider operates with reduced lift and/or increased drag in the second operation mode as compared to the first operation mode.

16. The glider according to claim 15, wherein the onboard steering elements comprise at least one aerodynamically active control surface.

17. The glider according to claim 16, wherein the at least one aerodynamically active control surface is selected from a group consisting of at least one aileron, at least one elevator and at least one rudder.

* * * * *